United States Patent [19]
Roberts et al.

[11] 4,182,437
[45] Jan. 8, 1980

[54] UNSTABLE DEVITRIFIABLE GLASSES AND FRICTION MATERIALS CONTAINING THEM

[75] Inventors: Gordon J. Roberts; James H. Heasley, both of Shaker Heights, Ohio

[73] Assignee: Ferro Corporation, Cleveland, Ohio

[21] Appl. No.: 903,746

[22] Filed: May 8, 1978

[51] Int. Cl.$^2$ ............... C03C 12/00; F16D 69/02
[52] U.S. Cl. ............... 188/251 A; 106/36; 106/50; 260/38; 260/DIG. 39
[58] Field of Search ............... 260/38, DIG. 39; 106/50, 36; 188/251 A

[56] References Cited

U.S. PATENT DOCUMENTS

| | | | |
|---|---|---|---|
| 3,844,800 | 10/1974 | Hooton | 106/36 |
| 3,891,595 | 6/1975 | Birchall | 260/DIG. 39 |
| 3,899,050 | 8/1975 | Sanary et al. | 188/251 A X |
| 3,967,037 | 6/1976 | Marzocchi et al. | 260/38 |
| 4,119,591 | 10/1978 | Aldrich | 188/251 A X |

FOREIGN PATENT DOCUMENTS 1445975   8/1976   United Kingdom .

*Primary Examiner*—Sandra M. Person
*Attorney, Agent, or Firm*—Wilson, Fraser, Barker & Clemens

[57] ABSTRACT

A combined friction modifier and reinforcing agent and friction materials containing it are disclosed in which the combined modifier and reinforcing agent comprises a substantially amorphous, unstable, finely divided glass convertible in response to heat generated by the friction material during use to a devitrified, crystallized, friable state which separates from the amorphous, unstable glass in a substantially non-smearing particulate form.

24 Claims, 1 Drawing Figure

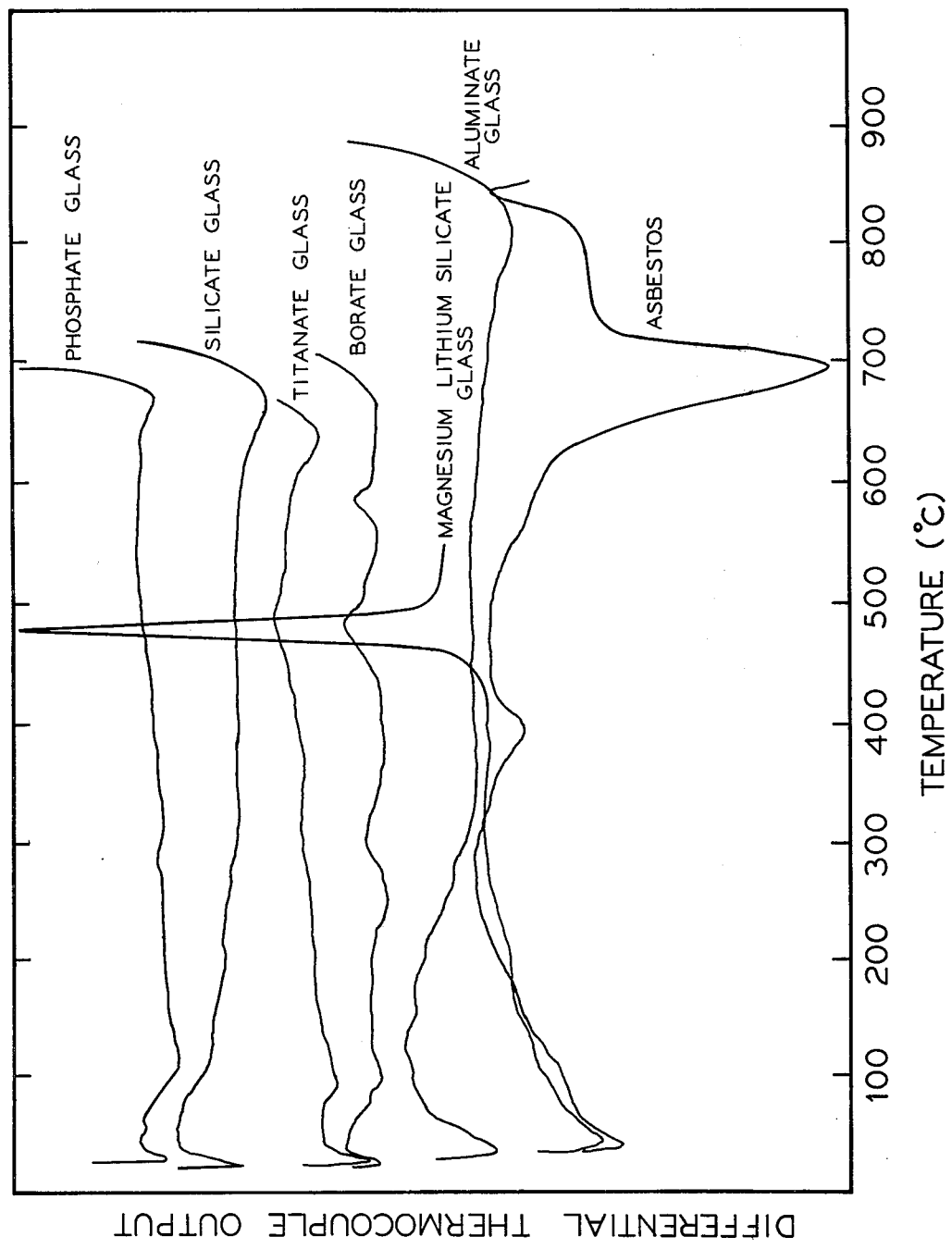

UNSTABLE DEVITRIFIABLE GLASSES AND FRICTION MATERIALS CONTAINING THEM

BACKGROUND OF THE INVENTION

Friction material such as that used in brake lining, clutch pads, and the like has severe performance requirements. The principal function of a friction element like a brake lining is to conert kinetic energy to heat and to absorb the heat or otherwise dissipate it while simultaneously through the agency of friction to reduce relative movement between the friction material and a part engaged by it. To achieve these objectives, it is necessary that the coefficient of friction between the friction material and the part so engaged be as reasonably high as possible, independent of variations in operating conditions, and accomplish the necessary energy conversion with a minimum wear of contacting parts. In particular, a friction material should not only have a relatively high coefficient of friction, but as well possess durability, heat stability, generate little or no noise while in rubbing contact with an engaging part, such as a rotor, and cause a minimum of wear on the engaged part.

In general, a friction material contains a matrix or binder, such as a thermosetting resin or vulcanized rubber, a fibrous reinforcement, and a friction modifier which aids in imparting a desired coefficient of friction to the material. Often the friction material may also contain fillers or extenders which modify its physical characteristics and reduce its cost.

Many frictional elements like brake linings have a tendency toward "fade", which is the inability to maintain a reasonably constant value of friction during repeated application of a brake system at a given speed, usually due to overheated brake linings. All linings exhibit fade to some extent. The inclusion of heat conducting particles, such as metal particles, in the friction material has been suggested to reduce the tendency to fade. However, this shortcoming still remains a serious problem.

Asbestos has been commonly used as a fibrous reinforcement for friction materials. However, asbestos is strongly suspected of being a carcinogen. Tiny fibers of asbestos are trapped by the mucous in the air passages of a human body, since the fibers are substantially insoluble and cannot be readily eliminated. Accordingly, an asbestos substitute has been sought which avoids the toxicity and potential medical liability attendent the use of asbestos in friction materials.

It has been suggested to substitute other fibrous materials for asbestos. For example, U.S. Pat. No. 2,861,964 to Gaugue, Jr., discloses the use of cellulosic fibers, such as wood fiber, as reinforcement for a composition brake block. U.S. Pat. No. 3,896,075 to Longley teaches the use of basalt fibers in complete substitution for asbestos fibers in friction materials. Basalt is a term applied to a group of volcanic rocks and defined as having a silica content of between 45% and 50%.

Glass has also been suggested as a component of friction material. U.S. Pat. No. 2,158,337 to Rasmussen discloses a brake lining material containing a glass fabric. Although there are thousands upon thousands of different glass compositions, no glass composition at all is disclosed in this patent for the purpose intended. Actually, glass fibers would not normally be considered effective in friction material, because they melt readily and fuse and become less viscous to smear or run-over companion parts, particularly at the brake interface, thereby seriously adversely effecting performance, especially fade.

In fact, the inherent tendency of a silicate glass under the influence of heat to fuse and smear, is used in U.S. Pat. No. 3,844,800 to Hooton to control wear of a friction material by controlling the formation of a surface glaze on the friction material which is created by the thermal energy generated during engagement with a corresponding friction element. Even in this instance, it is to be noted that the silicate glass powder is used in conjunction with a crystalline ceramic powder.

Normally, if glass is to be used in any form in friction material, one would choose a crystallized glass to avoid the problems of fusing, smearing, and run-out of amorphous glass when heat is produced by the friction material during use. This application of crystalline or ceramic glass is typified by U.S. Pat. No. 2,966,737 to Spokes et al, which relates to friction elements containing fibers which wear away without undergoing fusion in whole or in part and without undergoing any change tending to reduce friction. The fibers of this patent are said to remain dimensionally stable during use and, under high energy applications, do not undergo any significant chemical or mineralogical change. Heat may be applied during a sintering process encountered in production of the friction element or within the temperature limits of high energy braking. The patent recognizes the destruction of the fibrous character of non-crystalline glass by forming vitreous, separable products which migrate and reduce friction and detract from the essential fibrous nature of the fibers as originally incorporated in the friction element. To avoid this, the Spokes et al patent teaches forming fibers from sillimanite which is a member of the aluminim-silicate family crystallizing in the orthorhombic system.

British Pat. No. 1,445,975 is similar. This patent relates to friction material having non-vitreous fibers composed of a metal oxide salt such as a salt of alumina. When subjected to heat generated by the friction material, the alumina salt converts to a desired crystalline form, such as transitional and alpha aluminas, which consist of small crystallites, such that the alumina is ultimately used in the friction material in this crystalline fibrous form.

SUMMARY OF THE INVENTION

The principal object of the present invention is to provide an amorphous glass which, in finely divided form, is adapted for use as a combined friction modifier and reinforcing agent for friction material and which, in spite of its amorphous character, does not substantially fuse or smear under heat generated by the friction material and therefore does not adversely affect performance of such material.

The glass contemplated by the present invention is actually glass that would be considered in the art as inferior and to be avoided because of its highly unstable character and tendency to quick devitrification. In the practice of the invention, this and other infirmities of the glass are turned to advantage. Simplistically stated, the present glass may be considered to be amorphous glass that is anxious not to be amorphous glass. It is triggered to devitrify and separate from a vitreous remnant at the earliest opportunity at temperatures elevated with respect to room temperatures.

The present glass comprises a substantially amorphous, unstable, finely divided glass convertible in response to heat to a devitrified, crystallized, friable, substantially non-smearing form. As and when portions of the glass are converted, usually sequentially, by heat to a devitrified crystallized friable, non-smearing form, the devitrified portions separate or flake away from the remnant amorphous portions. Since the separated devitrified portions are crystallized, there is much less tendency for them to fuse or smear and thereby adversely affect performance characteristics of the friction material.

There are many glass compositions which can be smelted to form the unstable, amorphous glass of the invention. One attribute of the present glass is that it has a viscosity-temperature relationship enabling it to be fiberized when molten as the substantially amorphous glass, because rapid chilling of the glass is one technique of creating the unstable, amorphous character. This does not mean that the glass must be used in fibrous form although that is the preferred form. The glass can be employed in other forms, such as a particulate form. Glasses useful in the practice of the invention include silicate, titanate, phosphate, aluminate, and borate glasses and mixtures thereof.

The finely divided glass is conventionally incorporated into a matrix for forming a friction material, such as a rigid thermosetting heat-resistant organic resin.

BRIEF DESCRIPTION OF THE DRAWING

The accompanying FIGURE is a graph showing devitrification temperature characteristics of six different glasses of the invention in comparison with asbestos as determined by differential thermal analysis.

DESCRIPTION OF THE PREFERRED EMBODIMENTS

In resume, the present glass is adapted for use as a combined friction modifier and reinforcing agent for friction material which in use produces heat, the glass comprising a substantially amorphous, unstable, finely divided glass convertible in response to the heat to a devitrified crystallized, friable, substantially non-smearing form. Exemplary compositions are described of five basic glass systems which may be used. The preparation of the glass in a finely divided form and incorporation into a frictional material and then described, followed by a description of what takes place during use of the friction material insofar as is presently known. Test data on frictional elements containing each of the five basic glass systems are also supplied.

GLASS COMPOSITIONS

There are at least five glass systems which may be used in preparing the present amorphous, unstable glass, namely, silicate, titanate, phosphate, aluminate, and borate glasses and mixtures thereof. Each basic system may be modified with other oxides to impart a variety of desirable characteristics, such as melting point, fiberization, devitrification in a desired temperature range, strength, and the like. Typical modifying oxides are MgO, $Na_2O$, $Fe_2O_3$, $Li_2O$, ZnO, and CaO. It will be appreciated that a specific blass composition may fall into one or more of the five arbitrarily designated glass systems. For example, a titanate glass may contain significant amounts of silica and, on this basis, might also be termed a silicate glass.

One, non-exclusive test by which a given glass composition qualifies for use in the present invention is that of being fiberizable. This is not because the glass must be used in fibrous form, but because fiberizing quickly achieves the super-cooled, unstable, amorphous form that is desired. Accordingly, the glass preferably has a viscosity-temperature relationship at temperatures above its melting temperature to be fiberizable without substantial devitrification to a substantially amorphous state. Preferably, this viscosity-temperature relationship is such as to provide a relatively short working range, that is, the viscosity of the glass increases substantially with only a relatively small decrease in temperature so that the glass solidifies relatively quickly.

Glass compositions useful in the invention include the following in weight percent. These compositions are given by way of illustration only.

1. Silicate Glasses

Useful silicate glasses based on a ternary $Li_2O$, MgO, and $SiO_2$ system include approximately the following compositions in which $Fe_2O_3$ may optionally be used as a modifying oxide:

$SiO_2$: 60% to 75%
$Li_2O$: 10% to 30%
MgO: 8% to 20%
$Fe_2O_3$: 0% to 5%

Another useful silicate glass system comprises approximately the following compositions:

$SiO_2$: 39% to 51%
BaO: 45% to 58%
$Li_2O$: 4% to 6.5%
$Fe_2O_3$: 0% to 8%

Still other useful silicate glasses include approximately the following compositions:

|  | Percentage Range |
|---|---|
| $SiO_2$ | 35% to 75% |
| CaO | 25% to 40% |
| $Li_2O$ | 4% to 30% |
| MgO | 8% to 26% |
| $R_2O$ | 0% to 18% |
| BaO | 45% to 60% |
| $Fe_2O_3$ | 0% to 8% |
| F | 0% to 10% | in which R represents Na, K or mixtures thereof, and fluorine is present as a fluoride of at least one metal of the composition.

Preferred, specific silicate glass compositions include:

|  | Percent |
|---|---|
| $SiO_2$ | 48.0% |
| CaO | 29.5% |
| $Na_2O$ | 16.5% |
| $Fe_2O_3$ | 6.0% |
|  | 100.0% |
| And: |  |
| $SiO_2$ | 51% |
| CaO | 37% |
| $Na_2O$ | 12% |
|  | 100% |

2. Titanate Glasses

The useful glasses of this system are basically formed from $TiO_2$ and an alkali metal oxide. However, such basic titanate glass are often difficult to fiberize, and preferably the glasses include as well $SiO_2$ and still other additives. The alkali metal oxides include those of Na, K, Li, Rb, and Cs. The preferred alkali metal oxide is $Na_2O$.

The simplest titanate glass is sodium titanate. Another useful basic glass is sodium titanate (43.7% $Na_2O$ and 56.3% $SiO_2$) plus 2% of $B_2O_3$. Other useful ternary titanate glasses (using $Na_2O$ to illustrate the alkali metal oxide) include approximately the following compositions:

|  | Desired | Preferred |
|---|---|---|
| $TiO_2$ | 30% to 52% | 50% |
| $Na_2O$ | 20% to 40% | 30% |
| $SiO_2$ | 10% to 50% | 20% |

Still other useful titanate glasses include approximately the following compositions:
  $TiO_2$: 30% to 52%
  Alkali metal oxide: 20% to 40%
  $SiO_2$: 10% to 50%
  Additive: 0% to 33%
in which the alkali metal oxide is selected from the oxides of sodium, potassium, lithium, rubidium, cesium, and mixtures thereof, and said additive is selected from the group consisting of $B_2O_3$, $P_2O_5$, $ZrO_2$, $Al_2O_3$, $Fe_2O_3$, CaO, MgO, MnO and mixtures thereof.

A preferred specific titanate glass comprises 30% $TiO_2$, 20% $Na_2O$, and 50% calumite, a blast furnace slag. The entire titanate glass has this oxide analysis:
  $TiO_2$ 30%
  $Na_2O$ 21%
  CaO 21%
  $SiO_2$ 16%
  $Al_2O_3$ 9%
  MgO 2.5%
  MnO 0.5%

3. Phosphate Glasses

Phosphate glasses useful in the present invention include approximately the following exemplary compositions, iron oxide being an optional ingredient:
  $P_2O_5$: 35% to 52%
  CaO: 15% to 35%
  MgO: 15% to 28%
  $Fe_2O_3$: 0% to 10%
Additional useful phosphate glasses include approximately the following compositions:
  $P_2O_5$: 38% to 42%
  CaO: 15% to 25%
  ZnO: 32% to 47%
  $Fe_2O_3$: 0% to 10%
A preferred specific phosphate glass composition is:

| $P_2O_5$ | 48.6% |
|---|---|
| CaO | 34.9% |
| MgO | 16.5% |
|  | 100.0% |

4. Aluminate Glasses

One class of useful aluminate glasses comprises the calcium aluminates which optionally may contain one or more of a number of modifying divalent metal oxides or flourides and which may be included in addition to or in substitution of the CaO, as illustrated by the following compositions containing approximately the amounts indicated:
  $Al_2O_3$: 30% to 55%
  CaO: 35% to 50%
  Additive: 0% to 45%
in which the additive consists essentially of one or more of the following in approximately the percent indicated based on the total weight of the glass:
  $SiO_2$: 0% to 6%
  MgO: 0% to 7%
  $Fe_2O_3$: 0% to 18%
  $Li_2O$: 0% to 4%
  BaO: 0% to 18%
  Alkali metal oxide: 0% to 12%
  F: 0% to 10%

When present fluorine is as a flouride of at least one metal of the composition, usually the calcium.

Fluorides reduce the melting temperature and the crystallizing temperature of the glass and also make it more unstable. Silica tends to stabilize the glass but a few percent, up to about 6%, can be tolerated.

A preferred, specific aluminate glass is:

| $Al_2O_3$ | 52.2% |
|---|---|
| CaO | 47.8% |
|  | 100.0% |

5. Borate Glasses

The borate glasses comprise $B_2O_3$ in combination with a fairly wide range of modifying metal oxides. Example compositions have the following components in approximately the weight percent indicated:
  $B_2O_3$: 25% to 65%
  Metal Oxide: 35% to 75%
in which the metal oxide comprises one or more of the following in approximately the percent indicated based on the total weight of the glass:
  MgO: 0% to 65%
  $Al_2O_3$: 0% to 20%
  CaO: 0% to 65%
  ZnO: 0% to 50%
  $Li_2O$: 0% to 5%
  $Fe_2O_3$: 0% to 30%

A specific preferred borate glass composition is:

| $B_2O_3$ | 30.0% |
|---|---|
| CaO | 60.0% |
| $Fe_2O_3$ | 10.0% |
|  | 100.0% |

PREPARATION OF GLASS AND FRICTION MATERIAL

The glasses are conventionally smelted to a molten melt from the indicated ingredients or from materials forming the indicated oxides and fluorides during the smelt in a manner known in the art. The melt is then fiberized by any known means, such as blowing or attenuating molten glass issuing from a bushing by steam or air, wheel spinning, flame impinging, mechanically drawing fibers from a bushing, and the like. The fibers may be either continuous or discontinuous. The diameters and lengths of the fibers are not at all critical and may vary widely. For example, a diameter may average from about a 0.5 micron to about 30 microns and usually is about 1.75 microns. Lengths, when continuous fibers are not used, may average from about 1 centimeter to about 50 centimeters.

As previously indicated, fiberizing is an especially useful technique to obtain the desired unstable, amorphous glass condition, because the chilling rate during fiberization is so extremely high. It is estimated that fiberizing achieves a chilling rate upward of 1,000,000° C. per second, such that fibers obtained in this way can be exceptionally unstable and eager for crystallization when their compositions favor this conversion. If a glass composition cannot be fiberized, it is unlikely that the composition in finely divided form will be amorphous and unstable in accordance with the present concept.

Although fiberization is one technique of quickly obtaining the desired amorphous, unstable glass, the glass need not be used in fiber form. Other finely divided forms can be employed such as powder or beads which, if desired, can be fabricated from the fibers. However, the preferred form is fibrous since this form affords the greatest reinforcing strength for the friction material.

Any thermosetting, heat-resistant, organic resin capable of withstanding the heat generated by friction material may be used. As a rule, phenolic resins are best for this purpose, such as phenol-formaldehyde and phenol-furfural, but other thermosetting resins may also be used such as melamine-formaldehyde, urea-formaldehyde, epoxy resins, diallyl phthalate resins, dioctyl phthlate resins, cross-linked alkyd resins, and the like. Phenol-formaldehydes of the novalak type are preferred.

For some applications, elastomers may be included with the thermosetting heat-resistant organic resin to increase the frictional grab of the friction material. Although the elastomers need not be vulcanized, vulcanizable elastomers are preferred, and for this purpose known vulcanizing and/or curing agents are included with the mix forming the friction material. The elastomer is then vulcanized at the same time as the thermosetting resin is further or finally cured. Examples of elastomers that may be used include natural rubber, butadiene-acrylonitrile, butadiene-styrene, polybutadiene, and the like. As used here and in the claims the term "rigid, thermosetting, heat-resistant, organic resin" is taken to mean either a thermosetting organic resin as described or such a resin in combination with an elastomer as herein disclosed.

Other additives, modifiers, fillers, extenders known in the art may be added to the thermosetting organic resin. Such other added ingredients include, for instance, barytes, graphite, talc, litharge, kaolin, rosin, waterproofing agents such as waxes like mineral, hydrocarbon and vegetable waxes including, for example, beeswax, Montan wax, paraffin wax, ceresin wax, and the like (such waxes also lubricating the mixing together of the components of the friction material), minor amounts of oxides such as lime, zinc oxide, lead dioxide, silica sand, and manganese dioxide, sulfur (when vulcanization of an elastomer is contemplated), and the like.

Proportions are not critical. In general, the friction material contains in parts by weight from about 20 to about 80 parts of the resin, from about 5 to about 40 parts of the present finely divided glass. When an elastomer is added, it may be used up to about 12 parts by weight. When filler material is used, it may be added up to about 30 parts by weight.

To prepare the present friction material, one technique that may be used is the hot press method. Friction materials on which data were collected as herein given in the following examples were prepared in this way. The resin, glass fibers of the invention, and any filler material desired are dry blended in a mixer for about 15 to about 45 minutes until a uniform mixture is obtained. The resulting mix is placed in a mold and compacted as by a ram, while being warmed to form a brake lining. The amount of mix and pressure used are adjusted to obtain a brake lining of a desired thickness and density. The brake lining is stripped from the mold and post cured, for example at about 150° C. for 30 minutes. The temperatures of the mold and post cure are far below those which trigger devitrification of the glass fibers of the mix.

The friction material can be pressed and cured in the ultimate shape of the friction element or pressed and cured in sheets, generally following the above indicated procedure, and individual friction elements then cut from the resulting sheets. After preparing a strip or other form of the present friction material, it may be suitably secured, as by countersunk rivets or an adhesive, to a rigid backing member designed to support the friction material during its use. For example, the strip may be fastened either to a curved surface of an ordinary automotive brake shoe, where the lining is pressed against the internal surface of a rotating drum of a car wheel, or fastened to one face of a stator disc and pressed against a rotor disc secured to a car wheel. Examples of both types of application are illustrated in the figures of U.S. Pat. No. 3,477,983 to Keller. The present friction material can also be used as a brake lining in the manner illustrated by U.S. Pat. No. 1,851,087 to Denman.

PROCESS OF USE

When the present glass in finely divided form is used in friction material, it serves as a combined friction modifier and reinforcing agent. Especially in fibrous form, the glass strengthens and reinforces the friction material against rupture and breakage.

During use, the friction material generates heat as, for example, in contacting a moving member to brake it, such as a brake drum. The heat generated is not uniformly distributed throughout the friction material but tends to become concentrated at the interface between it and the moving member which may be considered to be the wear area. This phenomenon brings into play the amorphous-devitrification function of the present glass.

Assuming for convenience of description that the present glass is in fibrous form, as minute portions of the fibers reach the wear area (due to accumulated wearing away of the friction material) and are subjected to the generated heat, the glass of such minute portions releases its pent-up preference for crystallization, and the heated unstable portions quickly self-convert to a devitrified state which is brittle and dusts or flakes or otherwise separates from companion non-devitrified portions of the glass. The latter remain in the friction material as a combined friction modifier and reinforcing agent. In this manner, the fibers devitrify to the extent needed as the friction material wears away, that is, the fibers wear away in unison with the friction material.

The crystallized, devitrified glass portions may still continue to act as a friction modifier after separation from the amorphous unstable glass portions. However, it is certain that the separated glass portions because of their crystallized character do not substantially fuse and smear and adversely effect the performance of the friction material which has been the bane of prior use of amorphous glass fibers in this environment.

Devitrification as herein contemplated is a function of time and temperature. The glass should devitrify in one temperature range before it reaches a higher temperature range which contains the softening temperature of the glass. Otherwise, the glass loses its rigidity and behaves like soft butter such that the glass acts more like a lubricant. In the preferred practice, devitrification takes place within less than 30 seconds at temperatures within the range of about 400° C. to about 900° C. However, values outside these ranges can be used and still realize advantages of the invention. Glass which devitrifies in up to 5 minutes at a temperature within the range of about 400° C. to about 1000° C. is quite useful, and even these values are illustrative only and not critical. Similarly, to be useful, the glass need not undergo complete devitrification as long as that portion which does not devitrify when reaching the wear area is not sufficiently large to introduce to an intolerable extent the described fusing and smearing problems. As an example, at least 30% by weight of the glass should be devitrifiable at the elevated temperatures of use.

The accompanying figure shows devitrification characteristics of six different glasses of the present invention in comparison with asbestos, as determined by differential thermal analysis based on a differential thermocouple output versus temperature rise. In collecting data by a differential thermocouple, two platinum cups were placed within a furnace and connected to a thermocouple in a known manner, such that the thermocouple indicated any temperature difference between the two cups. One cup contained a standard, calcined alumina, while the other cup contained the material under test in the form of ground glass fibers. If there was no temperature differential between the two cups as the temperature of the furnace rose, the plotted line in the accompanying figure would be a straight horizontal line.

Data were collected in this manner for six glasses of the present invention and asbestos. It will be understood that in the accompanying figure, the plotted lines are displaced along the ordinate of the graph for purposes of comparison. Each line may be considered to start at the lowest temperature recorded and at a zero differential thermocouple output, since it is the differential reading (movement in the vertical direction of each line) which is significant.

The glasses illustrated in the figure had the following composition and weight percent:

| Phosphate Glass | | Silicate Glass | |
|---|---|---|---|
| $P_2O_5$ | 48.6% | $SiO_2$ | 51.0% |
| CaO | 34.9% | CaO | 37.0% |
| MgO | 16.5% | $Na_2O$ | 12.0% |
| | 100.0% | | 100.0% |
| Titanate Glass | | Borate Glass | |
| $TiO_2$ | 36.0% | $B_2O_3$ | 30.0% |
| $Na_2O$ | 27.9% | CaO | 60.0% |
| $SiO_2$ | 36.1% | $Fe_2O_3$ | 10.0% |
| | 100.0% | | 100.0% |
| Magnesium Lithium Silicate Glass | | Aluminate Glass | |
| $SiO_2$ | 60.0% | $Al_2O_3$ | 45.0% |
| $Li_2O$ | 25.0% | CaO | 46.0% |

-continued

| | | | |
|---|---|---|---|
| MgO | 15.0% | MgO | 6.3% |
| | 100.0% | $SiO_2$ | 2.7% |
| | | | 100.0% |

When a line of the graph drops, it signifies that the material under test is absorbing heat. Conversely, when a line of the graph rises, it signifies that the material under test is releasing heat. It is a characteristic of glass that it releases heat upon crystallization.

Thus in the case of asbestos, there is absorption of heat in the approximate range of about 600° C. to about 700° C. which corresponds to loss of water by asbestos. Heat is required to drive off the water. At about 690° C., asbestos is no longer a fiber but a powdery mineral. However, all of the glass compositions show crystallization or release of heat by rising peaks or rapidly upturned terminal lines. The magnesium lithium silicate glass shows a quite sharp devitrification at about 460° C. The other glasses show devitrification at temperatures ranging from about 640° C. for the sodium titanium silicate glass to about 850° C. for the aluminate glass.

EXAMPLES

The following examples are intended only to illustrate the use of the present combined friction modifier and reinforcing agent in friction material and should not be construed to impose limitations upon the claims.

In these examples, brake lining materials were prepared in the manner previously described using glass fibers of the present invention and asbestos. A standard mix was used which varied only in the weight of fibers added so as to achieve equal volume of fibers rather than equal weight, as is required in the standard test, SAE J661a. For example, the mixes that were cast for brake liners with asbestos and with glass fibers of the titanate glass of the following Example 1 had these compositions in weight percent:

| | Asbestos | Titanate Glass (Example 1) |
|---|---|---|
| Fiber weight | 66.0% | 70.0% |
| Phenol-formaldehyde resin | 20.0% | 17.3% |
| Cashew nut oil modified resin | 12.0% | 10.8% |
| Gilsonite | 2.0% | 1.7% |
| Total | 100.0% | 99.8% |

EXAMPLE 1 THROUGH 7

Brake liners were prepared for six of the present glass compositions and asbestos. These liners were tested in accordance with SAE J 661a test procedure. Tables A and B list the coefficients of friction and other physical properties of the resulting brake liners. The "normal" coefficient of friction is one at a test under 200° F., and the "hot" coefficient of friction is one at a test above 200° F. The letter grades following the coefficients of friction are those assigned in accordance with the SAE J 661a test. The later in the alphabet in which the letter appears, the better the test results.

TABLE A

Frictional Properties Of Brake Lining Materials Prepared With Glass Fibers

| | | Coefficient of Friction | |
|---|---|---|---|
| Example | Type of Fibrous Glass | Normal | Hot |
| 1 | Titanate (blown) | 0.33(E) | 0.34(E) |
| 2 | Titanate (drawn) | 0.52(G) | 0.39(F) |
| 3 | Aluminate | 0.35(E) | 0.36(F) |
| 4 | Borate | 0.42(F) | 0.32(E) |
| 5 | Lithia-Magnesia-Silicate | 0.49(G) | 0.36(F) |
| 6 | Phosphate | 0.16(D) | 0.06(C) |
| 7 | Asbestos-Control | 0.41(F) | 0.33(E) |

TABLE B

Flexural Properties Of Brake Lining Materials Prepared With Glass Fibers

| Ex. | Type of Fiber | Density | Flexural Strength | Flexural Modulus $10^6$Psi |
|---|---|---|---|---|
| 1 | Titanate (blown) | 1.96 | 2880 | 0.48 |
| 2 | Titanate (drawn) | 1.88 | 2330 | 0.40 |
| 3 | Aluminate | 1.68 | 4670 | 0.85 |
| 4 | Borate | 1.79 | 4960 | 0.96 |
| 5 | Lithia-Magnesia-Silicate | 1.72 | 5740 | 1.14 |
| 6 | Phosphate | 1.79 | 4770 | 1.06 |
| 7 | Asbestos-Control | 1.78 | 10,300 | 1.31 |

The glasses of Examples 1 through 6 had the following compositions:

| Example 1 | | Example 2 | |
|---|---|---|---|
| $TiO_2$ | 55.2% | $TiO_2$ | 33.8% |
| $Na_2O$ | 42.8% | $Na_2O$ | 26.2% |
| $B_2O_3$ | 2.0% | $SiO_2$ | 40.0% |
| | 100.0% | | 100.0% |

| Example 3 | | Example 4 | |
|---|---|---|---|
| $Al_2O_3$ | 47.7% | $B_2O_3$ | 32.4% |
| CaO | 46.0% | $Al_2O_3$ | 15.7% |
| MgO | 6.3% | CaO | 51.9% |
| | 100.0% | | 100.0% |

| Example 5 | | Example 6 | |
|---|---|---|---|
| $SiO_2$ | 65.0% | $P_2O_5$ | 68.7% |
| $Li_2O$ | 24.0% | ZnO | 23.5% |
| MgO | 11.0% | MgO | 7.7% |
| | 100.0% | | 99.9% |

There was no evidence of the fibers of these glasses smearing under the heat generated during the test.

EXAMPLES 8 THROUGH 17

Nine additional brake liners were prepared and tested as in the manner of Examples 1 through 7. Table C indicated the letter grade designated for each of these brake liners by the SAE J 661a test.

TABLE C

Frictional Properties Of Brake Lining Materials Prepared With Glass Fibers

| | | Coefficient of Friction | |
|---|---|---|---|
| Example | Type of Fibrous Glass | Normal | Hot |
| 8 | Borate | G | D |
| 9 | Silicate | G | F |
| 10 | Calumite | G | F |
| 11 | Silicate | G | E |
| 12 | Phosphate | D | D |
| 13 | Silicate | F | E |
| 14 | Titanate | F | D |
| 15 | Silicate | D | D |
| 16 | Silicate | C | C |
| 17 | Asbestos | F | E |

Examples 8 and 9 had the same composition as previously given, respectively, for the borate glass and the silicate glass of the graph of the accompanying figure. Example 10 is a calumite-containing titanate glass whose oxide analysis has previously been given. The other examples comprised the following compositions in weight percent.

| Example 10 | | Example 11 | |
|---|---|---|---|
| Calumite | 50.0% | $TiO_2$ | 30% |
| $TiO_2$ | 30.0% | $Na_2O$ | 20% |
| $Na_2O$ | 20.0% | $SiO_2$ | 33.3% |
| | 100.0% | $Fe_2O_3$ | 16.7% |
| | | | 100.0% |

| Example 12 | | Example 13 | |
|---|---|---|---|
| $P_2O_5$ | 50.0% | $SiO_2$ | 48.0% |
| CaO | 33.0% | CaO | 29.5% |
| MgO | 17.0% | $Na_2O$ | 16.5% |
| | 100.0% | $Fe_2O_3$ | 6.0% |
| | | | 100.0% |

| Example 14 | | Example 15 | |
|---|---|---|---|
| $SiO_2$ | 50.0% | $SiO_2$ | 75.0% |
| $TiO_2$ | 30.0% | $Li_2O$ | 10.0% |
| $Na_2O$ | 20.0% | MgO | 10.0% |
| | 100.0% | $FE_2O_3$ | 5.0% |
| | | | 100.0% |

| Example 16 | |
|---|---|
| $SiO_2$ | 70.0% |
| MgO | 13.0% |
| $Li_2O$ | 12.0% |
| $Fe_2O_3$ | 5.0% |
| | 100.0% |

There was no evidence of the fibers of these glasses smearing under the heat generated during the test.

Although the foregoing describes several embodiments of the present invention, it is understood that the invention may be practiced in still other forms within the scope of the following claims.

We claim:

1. A glass adapted for use as a friction modifier for friction material which in use produces heat, said glass comprising a substantially amorphous, unstable, finely divided glass convertible in response to said heat to a devitrified, crystallized, friable, substantially non-smearing form, said glass being selected from a class of glasses consisting essentially of silicate, titanate, phosphate, aluminate, and borate glasses and mixtures thereof.

2. The glass of claim 1 in which said amorphous glass is in fibrous form.

3. A combined friction modifier and reinforcing agent for friction material which in use produces heat within a predetermined temperature range, said combined friction modifier and reinforcing agent comprising a substantially amorphous, unstable, finely divided glass, portions of said glass being adapted sequentially to be converted by temperatures within said predetermined temperature range to a devitrified, crystallized, friable, substantially non-smearing form as and when the temperature of said portions reaches within said temperature range, said glass having a viscosity-temperature relationship enabling it to be fiberized when molten as said substantially amorphous glass, said glass being selected from a class of glasses consisting essentially of silicate, titanate, phosphate, aluminate, and borate glasses and mixtures thereof.

4. The combined friction modifier and reinforcing agent of claim 3 in which said amorphous glass is in fibrous form.

5. Friction material which in use produces heat within a predetermined temperature range, said material containing as a combined friction modifier and reinforcing agent a substantially amorphous, unstable, finely divided glass dispersed in said material, portions of said glass being adapted sequentially to be converted by temperature within said predetermined temperature range to a devitrified, crystallized, friable form, as and when the temperature of said portions reaches within said temperature range, said devitrified portions separating from companion non-devitrified portions of said glass, and said companion non-devitrified portions remaining as a combined friction modifier and reinforcing agent, said glass being fiberizable and selected from a class of glasses consisting of silicate, titanate, phosphate, aluminate, and borate glasses and mixtures thereof.

6. Friction material of claim 5 in which said substantially amorphous glass is in fibrous form.

7. Friction material of claim 5 in which said material is a rigid, thermosetting, heat-resistant organic resin.

8. Friction material of claim 5 in which said material is a brake lining.

9. Friction material of claim 5 in which said amorphous glass devitrifies from about 400° C. to about 900° C.

10. Friction material of claim 5 in which said glass devitrifies in up to 5 minutes at a temperature within the range of about 400° C. to about 1000° C.

11. Friction material of claim 5 in which said amorphous glass is a silicate glass having approximately the following composition in weight percent:
$SiO_2$: 35% to 75%
CaO: 25% to 40%
$Li_2O$: 4% to 30%
MgO: 8% to 26%
$R_2O$: 0% to 18%
BaO: 45% to 60%
$Fe_2O_3$: 0% to 8%
F: 0% to 10%
in which R is Na, K or mixtures thereof, and flourine is present as a fluoride of at least one metal of the composition.

12. Friction material of claim 5 in which said amorphous glass is a titanate glass having approximately the following composition in weight percent:
$TiO_2$: 30% to 52%
Alkali metal oxide: 20% to 40%
$SiO_2$: 10% to 50%
Additive: 0% to 33%
in which said alkali metal oxide is selected from the oxides of sodium, potassium, lithium, rubidium, cesium, and mixtures thereof, and said additive is selected from the group consisting of $B_2O_3$, $P_2O_5$, $ZrO_2$, $Al_2O_3$, $Fe_2O_3$, CaO, MgO, MnO, and mixtures thereof.

13. Friction material of claim 5 in which said amorphous glass is a phosphate glass having approximately the following composition in weight percent:
$P_2O_5$: 35% to 52%
CaO: 15% to 35%
MgO: 15% to 28%
$Fe_2O_3$: 0% to 10%.

14. Friction material of claim 5 in which said amorphous glass is an aluminate glass having approximately the following composition in weight percent:
$Al_2O_3$: 30% to 55%
CaO: 35% to 50%
Additive: 0% to 45%
said additive consisting essentially of one or more of the following in approximately the percent indicated based on the total weight of the glass:
$SiO_2$: 0% to 6%
MgO: 0% to 7%
$Fe_2O_3$: 0% to 18%
$Li_2O$: 0% to 4%
BaO: 0% to 18%
Akali metal oxide: 0% to 12%
F: 0% to 10%
the fluorine when present being as a fluoride of at least one metal of the composition.

15. Friction material of claim 5 in which said amorphous glass is a borate glass having approximately the following composition in weight percent:
$B_2O_3$: 25% to 65%
Metal Oxide: 35% to 75%
said metal oxide consisting essentially of one or more of the following in approximately the percent indicated based on the total weight of the glass:
MgO: 0% to 65%
$Al_2O_3$: 0% to 20%
CaO: 0% to 65%
ZnO: 0% to 50%
$Li_2O$: 0% to 5%
$Fe_2O_3$: 0% to 30%.

16. A process for braking a moving member comprising contacting said member with friction material containing as a combined friction modifier and reinforcing agent a substantially amorphous, unstable, finely divided glass dispersed in said material, generating heat by said contact, devitrifying and crystallizing portions of said glass by said heat, and separating said devitrified and crystallized portions of glass from non-devitrified portions of said glass in the absence of substantial smearing of said separated devitrified glass portions, while retaining the non-devitrified glass portions in said friction material as a combined friction modifier and reinforcing agent, said glass being selected from a class of glasses consisting essentially of silicate, titanate, phosphate, aluminate, and borate glasses and mixtures thereof.

17. The process of claim 16 in which said glass is in fibrous form.

18. A process of claim 16 in which said material is a rigid, thermosetting, heat-resistant organic resin.

19. The process of claim 16 in which said glass devitrifies in up to five minutes at a temperature within the range of about 400° C. to about 1000° C.

20. The process of claim 16 in which at least 30 percent by weight of said separating portions is devitrified.

21. A process for improving friction material adapted in use to generate heat within a predetermined temperature range including dispersing within said material a combined friction modifier and reinforcing agent comprising a substantially amorphous, unstable, finely divided glass, portions of said glass being adapted sequentially to be converted by temperature within said predetermined temperature range to a devitrified, crystallized, friable form, as and when the temperature of said portions reaches within said temperature range, said devitrified portions separating from companion non-devitrified portions of said glass, and said companion non-devitrified portions remaining as a combined friction modifier and reinforcing agent, said glass being fiberizable and selected from a class of glasses consisting of silicate, titanate, phosphate, aluminate, and borate glasses and mixtures thereof.

22. Friction material of claim 5 in which said amorphous glass is a silicate glass having approximately the following composition in weight percent:
 $SiO_2$: 60% to 75%
 $Li_2O$: 10% to 30%
 MgO: 8% to 20%
 $Fe_2O_3$: 0% to 5%.

23. Friction material of claim 5 in which said amorphous glass is a silicate glass having approximately the following composition in weight percent:
 $SiO_2$: 39% to 51%
 BaO: 45% to 58%
 $Li_2O$: 4% to 6.5%
 $Fe_2O_3$: 0% to 8%.

24. Friction material of claim 5 in which said amorphous glass is a phosphate glass having approximately the following composition in weight percent:
 $P_2O_5$: 38% to 42%
 CaO: 15% to 25%
 ZnO: 32% to 47%
 $Fe_2O_3$: 0% to 10%.

* * * * *